(12) United States Patent
Brandt et al.

(10) Patent No.: US 11,515,669 B2
(45) Date of Patent: Nov. 29, 2022

(54) FLOATING HEADER AND CIRCUIT BOARD ASSEMBLY

(71) Applicant: TE Connectivity Services GmbH, Schaffhausen (CH)

(72) Inventors: Christian Brandt, Middletown, PA (US); John Hall, Middletown, PA (US); Jesse Baker, Middletown, PA (US); Nathan Swanger, Middletown, PA (US); Keith Foltz, Middletown, PA (US); Neil Schroll, Middletown, PA (US); James Raudenbush, Middletown, PA (US); Nicholas Evans, Middletown, PA (US); Emilio L. Cuesta, Middletown, PA (US)

(73) Assignee: TE Connectivity Solutions GmbH

( * ) Notice: Subject to any disclaimer, the term of this patent is extended or adjusted under 35 U.S.C. 154(b) by 0 days.

(21) Appl. No.: 17/148,040

(22) Filed: Jan. 13, 2021

(65) Prior Publication Data

US 2021/0288443 A1  Sep. 16, 2021

Related U.S. Application Data

(60) Provisional application No. 62/988,143, filed on Mar. 11, 2020.

(51) Int. Cl.
| | | |
|---|---|---|
| *H01R 13/631* | (2006.01) | |
| *H01R 24/50* | (2011.01) | |
| *H01R 24/52* | (2011.01) | |
| *H01R 13/52* | (2006.01) | |

(52) U.S. Cl.
CPC ..... *H01R 13/6315* (2013.01); *H01R 13/5219* (2013.01); *H01R 24/50* (2013.01); *H01R 24/52* (2013.01)

(58) Field of Classification Search
None
See application file for complete search history.

(56) References Cited

U.S. PATENT DOCUMENTS

| | | | | |
|---|---|---|---|---|
| 4,764,130 | A * | 8/1988 | DiClemente | H01R 13/506 439/701 |
| 6,758,680 | B2 * | 7/2004 | Duquerroy | H01R 24/50 439/63 |
| 10,193,252 | B2 * | 1/2019 | Sakamoto | H04N 5/2257 |
| 10,424,424 | B2 * | 9/2019 | Farrell | H01R 13/6584 |
| 10,658,774 | B2 * | 5/2020 | Conger | H01R 12/716 |

(Continued)

OTHER PUBLICATIONS

International Search Report, International Application No. PCT/IB2021/052031 dated Mar. 11, 2021.

*Primary Examiner* — Ross N Gushi

(57) ABSTRACT

A connector assembly includes an outer conductive body having a first end configured to mate with a corresponding electrical connector, and a conductive center contact arranged within the outer conductive body. The center contact comprises a first end configured to mate with the corresponding electrical connector and a second end electrically connecting with a first electrical contact of a circuit board. An outer contact is slidably attached to a second end of the outer conductive body and electrically connects with a second electrical contact of the circuit board. An elastic element is provided for biasing the outer contact in a direction away from the outer conductive body and toward the circuit board.

20 Claims, 7 Drawing Sheets

(56) References Cited

U.S. PATENT DOCUMENTS

| | | | |
|---|---|---|---|
| 10,790,624 B2* | 9/2020 | Wang | H01R 24/50 |
| 2011/0279675 A1* | 11/2011 | Mano | H04N 5/2257 |
| | | | 348/148 |
| 2018/0183162 A1 | 6/2018 | Sakamoto | |
| 2019/0280439 A1* | 9/2019 | Ni | H01R 13/2421 |
| 2019/0305457 A1* | 10/2019 | Song | H01R 13/2407 |

* cited by examiner

FLOATING HEADER AND CIRCUIT BOARD ASSEMBLY

CROSS-REFERENCE TO RELATED APPLICATIONS

This application claims priority under 35 U.S.C. § 119 to U.S. Provisional Patent Application No. 62/988,143, filed Mar. 11, 2020.

FIELD OF THE INVENTION

The present disclosure relates to electrical connectors, and more particularly, to a floating header electrically connectable to a circuit board.

BACKGROUND

Electronic components, such as sensor assemblies, are often housed or packaged separately from a remainder of a larger electrical system in which they are utilized, promoting ease of integration and improved protection of sensitive components from harsh environmental conditions. Accordingly, in use, these components must be electrically interconnected with other elements of the system. These connections are often realized by cables joining various components via complementary electrical connectors.

Achieving high performing, reliable interconnection on a scale suitable for mass production can be difficult to achieve. For example, tolerance limitations adversely affecting the accuracy with which the components and/or housings can be manufactured, and/or the accuracy by which a component can be placed on or within an associated housing, can have a related negative effect on the underlying electrical systems. Such deviations often result in difficulties assembling the components, and/or reliably forming the required electrical connections between the components and connector(s) of the assembly. Further, the performance of some classes of devices, such as radio frequency (RF) devices, maybe highly susceptible to conductivity factors, such as impedance matching between components of a connector or interface. These performance considerations place more restrictions on the underlying connectors, including limiting the ways in which the above-described positional variations may be accommodated while retaining acceptable performance levels.

Accordingly, there is a need for improved systems for reliably connecting components of packaged electronic devices to external systems.

SUMMARY

An electrical header or connector assembly includes an outer conductive body having a first end configured to mate with a corresponding electrical connector, and a conductive center contact arranged within, and electrically isolated from, the outer conductive body. The center contact comprises a first end configured to mate with the corresponding electrical connector, and a second end configured to electrically connect with a first electrical contact of a circuit board. An outer contact of the assembly is slidably connected to a second end of the outer conductive body and configured to electrically connect with a second electrical contact of the circuit board. An elastic element is provided for biasing the outer contact in a direction away from the outer conductive body and toward the circuit board.

An electrical device comprises a housing including a first housing section and a second housing section coupled to the first housing section. A circuit board is arranged within the housing, and comprises a first electrical contact and a second electrical contact electrically isolated from the first electrical contact. A radio frequency connector assembly arranged within the housing comprises an outer conductive body having a first end configured to mate with a corresponding electrical connector. The assembly further comprises a conductive center contact arranged within the outer conductive body and having a first end configured to mate with the corresponding electrical connector and a second end contacting the first electrical contact of the circuit board. An outer contact is slidably connected to a second end of the outer conductive body and electrically connects with the second electrical contact of the circuit board. An elastic element is provided for biasing the outer contact in a direction away from the outer conductive body and into contact with the second electrical contact.

A connector assembly comprises a first electrical connector including a first outer conductive body, a first dielectric body arranged within the first outer conductive body, and a first conductive center contact arranged within the first dielectric body. A second electrical connector of the assembly is mateable with the first electrical connector and comprises a second outer conductive body, a second dielectric body arranged within the second outer conductive body, and a second conductive center contact arranged within the second dielectric body. In a mated state of the first and second connectors the first and second outer conductive bodies and the first and second conductive center contacts of the first and second electrical connectors are electrically connected. The assembly further includes an elastic bushing arranged between and contacting opposing faces of the first and second dielectric bodies with the first and second electrical connectors in the mated state.

BRIEF DESCRIPTION OF THE DRAWINGS

The invention will now be described by way of example with reference to the accompanying figures, of which.

DETAILED DESCRIPTION OF THE EMBODIMENTS

Figure 1:
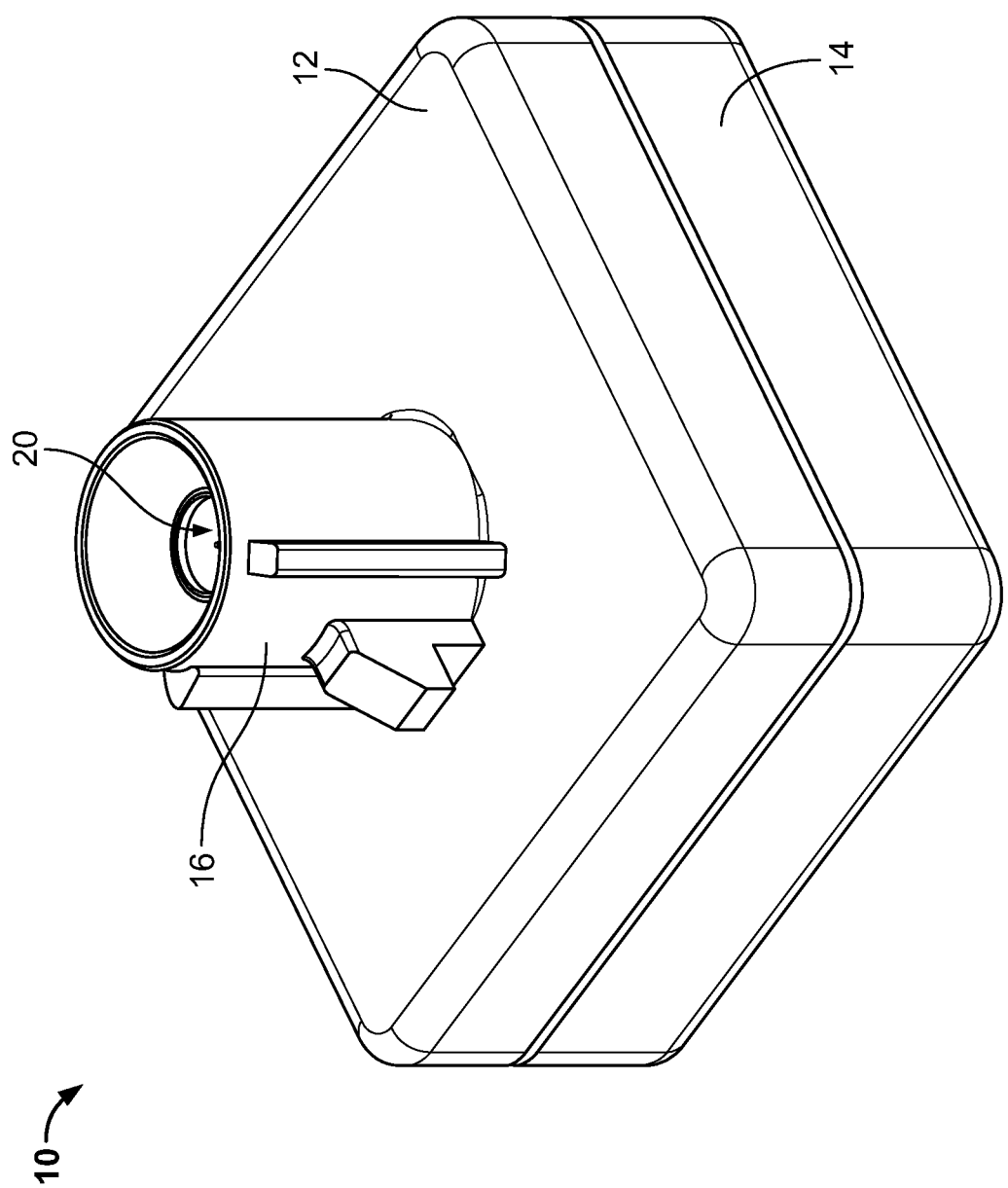
FIG. 1 is perspective view of an exemplary electronic device useful for describing embodiments of the present disclosure.

Exemplary embodiments of the invention will be described hereinafter in detail with reference to the attached drawings, wherein like reference numerals refer to like elements. The invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Referring generally to FIG. 1, a perspective view of an exemplary electronic device or package 10 is provided. The package 10 comprises a two-part housing, including a first or upper housing 12 mated to a second or lower housing 14. The housing 12,14 may be a molded polymer housing suitable to secure an electronic component or device therein, such as a camera or other sensor. A header or electrical connector 20 according to embodiments of the present disclosure is arranged within the housing 12,14, and is configured to be mated to the device, as well as to a corresponding connector, such as a connectorized end of a coaxial RF cable. Specifically, the upper housing 12 may include a connector interface 16 receiving a portion of the connector 20 from within the housing. The connector interface 16 may be formed in any desired configuration, such as a standardized FAKRA interface utilized in many automotive applications.

Figure 2:
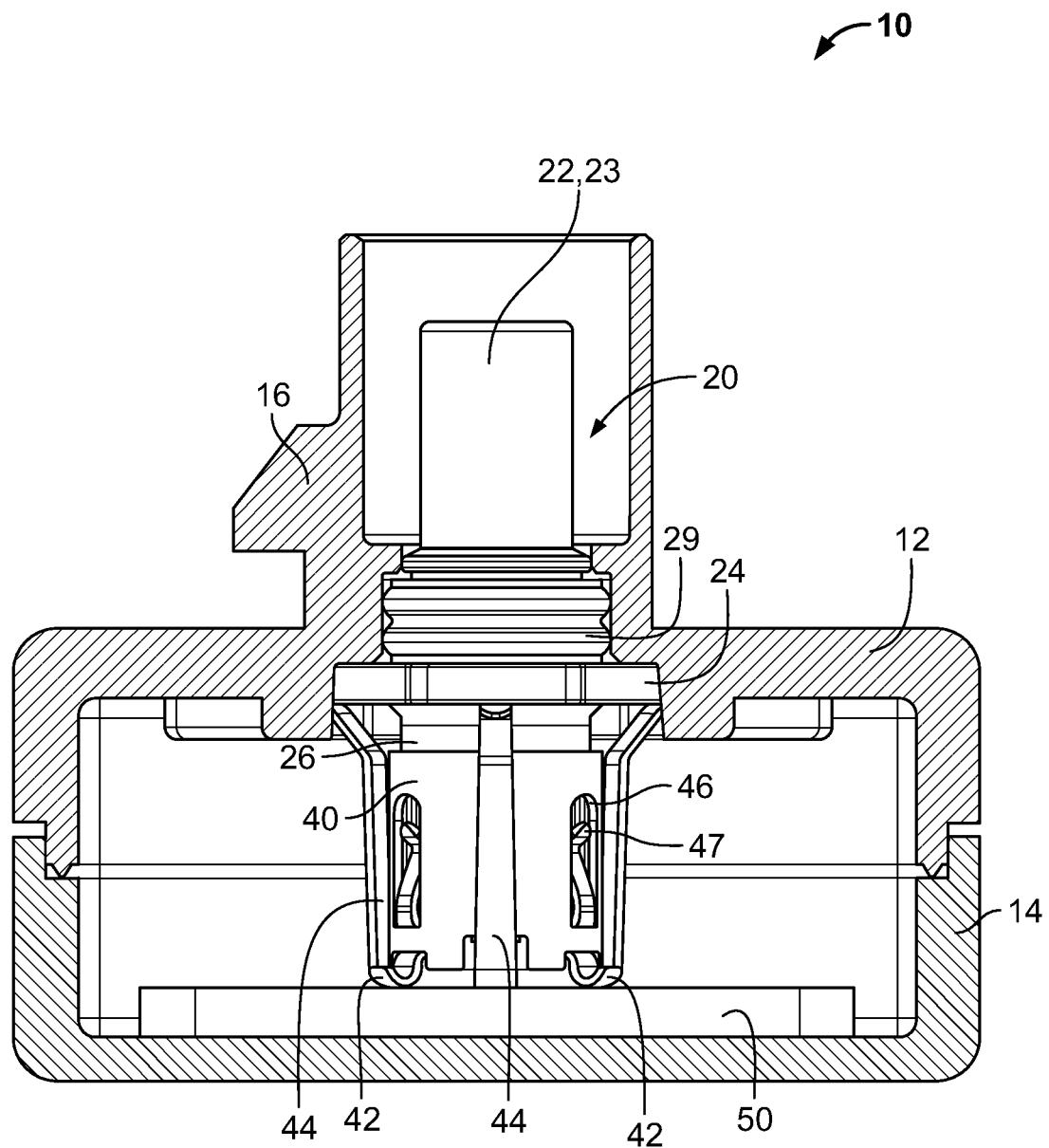
FIG. 2 is a cross-sectional view of the device of FIG. 1, including an electrical connector or header and a circuit board according to an embodiment of the present disclosure.

FIG. 2 provides a cross-sectional view of the exemplary package 10 according to an embodiment of the present disclosure. A printed circuit board (PCB) 50 of the electronic device (e.g., a circuit board including a camera mounted thereon) is arranged within the housing 12,14. The PCB 50 may be fixedly attached within the housing 12,14, for example, to the lower housing 14 as shown. The header or connector 20 according to an embodiment of the present disclosure is arranged at least partially within the housing 12,14, and includes a first end extending into the connector interface 16 for connecting to a coaxial cable, by way of example only. A second end of the connector 20 engages with one or more contact surfaces or pads of the PCB 50 for establishing an electrical connection between the cable and the electronic device associated with the PCB.

Due to, for example, manufacturing or positional inaccuracies associated with any of the above-mentioned components, the PCB, the connector and/or the connector interface may not be ideally aligned during assembly of the package. In embodiments of the prior art which include a connector soldered to the PCB, this type of misalignment may prevent proper assembly of the device. In other prior art assemblies, these discrepancies may result in insufficient or unreliable electrical contact between the PCB and the connector after assembly. As set forth in detail herein, embodiment of the present disclosure remedy these deficiencies, and provide a connector having a contact end that is in movable electrical contact with the PCB, such that any misalignment between the PCB and the connector in lateral or vertical directions may be accommodated during an assembly process of the housing.

Figure 3:
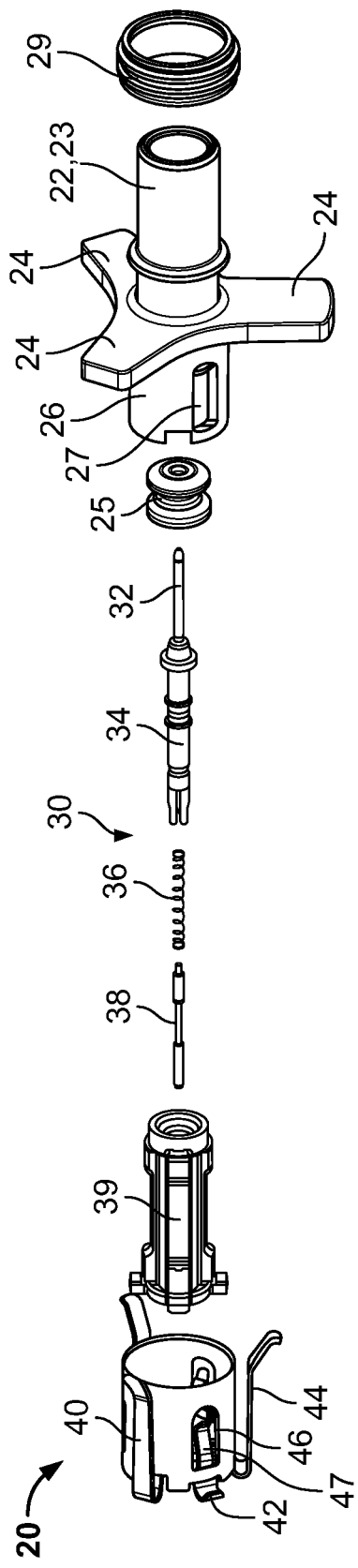
FIG. 3 is an exploded view of the connector shown in FIG. 2.
Figure 4:
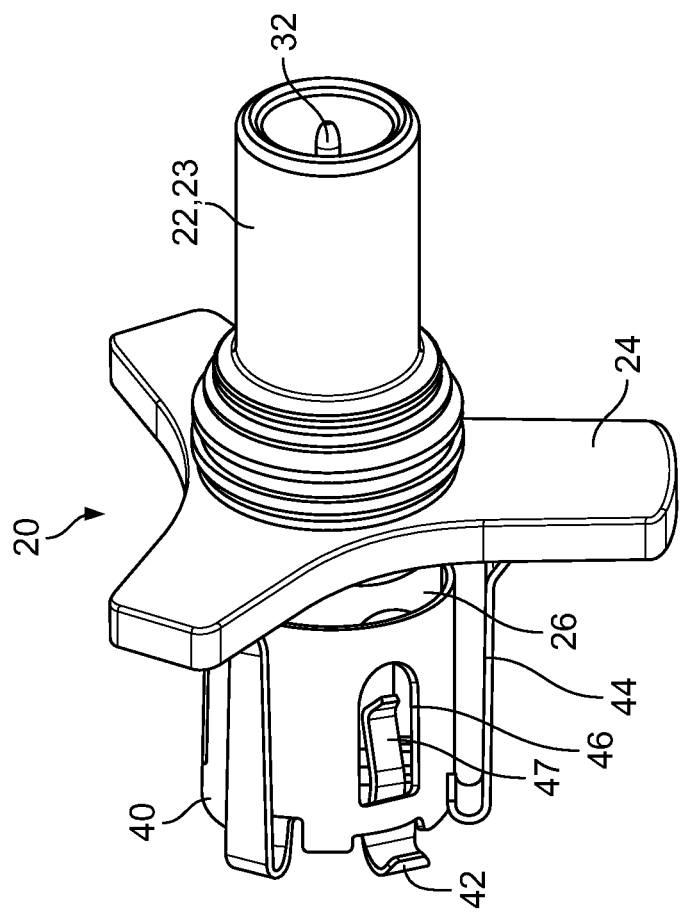
FIG. 4 is an assembled view of the connector shown in FIG. 3.

Still referring to FIG. 2, as well as to FIGS. 3 and 4, the connector 20 according to embodiments, of the present disclosure includes an outer conductive body or shell 22 (e.g., a diecast monolithic body) having a cylindrical first end 23 extending from within the housing 12,14 and into an opening defined within the connector interface 16. The outer conductive body 22 further comprises an intermediate portion defining at least one radially-extending protrusion or bearing surface 24. In one embodiment, three protrusions 24 are formed and are spaced 120 degrees apart from one another about a perimeter of the outer conductive body 22 relative to a central axis thereof. A first side of each protrusion 24 may engage with or abut an interior surface of the upper housing 12, limiting the insertion depth of the first end 23 of the conductive body 22 within the connector interface 16. A cylindrical second end 26 of the outer conductive body 22 extends from the intermediate portion in a direction opposite the first end 23. The outer conductive body 22 defines an outer electrical conductor or shielding conductor (e.g., a ground conductor) of the connector 20. An annular outer seal 29 may be arranged over the first end 23 for creating a seal between the connector 20 and the upper housing 12, isolating the opening formed in the connector interface 16 from an interior of the housing 12,14.

A hollow outer contact 40 is fitted over the second end 26 of the outer conductive body 22, and defines a movable mechanical and electrical connection therewith in which the outer contact is slidable along the second end in an axial direction of the connector 20 while retaining electrical contact therewith. The second end 26 may comprises slots or cavities 27 formed therein (see FIG. 3) which are configured to receive portions of the outer contact 40 for slidably securing the outer contact to the second end. More specifically, the outer contact 40 may define slot-like apertures 46 formed therethrough. Elastic arms 47 defined by or attached to the outer contact 40 may extend radially inward and into the apertures 46. Free ends of the arms 47 are configured to engage with the second end 26, and more specifically, engage with the slots 27 thereof, for securing the outer contact 40 to the second end 26 in a friction-fit, slidable manner at least along the length of the slots.

The outer contact 40 further includes electrical contact legs or tabs 42 extending from an end thereof. The tabs 42 may be arranged symmetrically around the outer contact 40, for example with three tabs arranged 120 degrees apart from one another about a perimeter or diameter of the outer contact. The tabs 42 are configured to abut or otherwise contact one or more contacts or contact pads formed on the PCB 50. The tabs 42 may be formed integrally with the outer contact 40, or may comprise discrete elements mechanically attached thereto. In one embodiment, the tabs 42 and arms 47 may be formed integrally with one another and mechanically attached to the outer contact 40, or may each be formed integrally with the outer contact. The use of a plurality of tabs 42 provides for multiple coaxial ground contact points, improving the shielding effectiveness of the conductor. Shielding effectiveness is also improved by the generally uniform and/or uninterrupted nature of all or part of the outer contact 40, for example, the continuous nature of the first end 23 of the outer conductive body 22.

The outer contact 40 comprises at least one elastic element, such as one or more springs 44 integrally formed therewith, or attached thereto. In the illustrated embodiment, the springs 44 define elastic arms extending from an end of the outer contact 40. Each of the springs 44 may be curved proximate a first end thereof that is fixed relative to the outer contact 40. A remaining portion of each spring 44 extends in a direction toward the outer conductive body 22 and generally parallel with the body of the outer contact 40. A free end of each spring 44 may be shaped or curved so as to extend radially outward from the outer contact 40, and defines a contact surface thereon configured (i.e., sized and located) to abut one or the radially-extending protrusions 24. More specifically, each of the radially-extending protrusions 24 of the outer conductive body 22 defines a bearing or pressing surface against which the free end of a respective spring 44 may act in an assembled state of the connector 20. In this way, the springs 44 act to urge or bias the outer contact 40 in a direction away from the outer conductive body 22, and thus apply a pressing force on the corresponding contacts of the PCB 50 via the tabs 42, ensuring reliable electrical contact and low resistance or impedance, as well as permitting a degree of variation in position of the PCB relative to the connector in an axial direction without negatively affecting the electrical contact therebetween. In one embodiment, the outer contact 40 includes three springs 44 arranged 120 degrees apart from one another about a perimeter of the outer contact, and radially staggered with respect to the tabs 42, for providing even force distribution. In still other embodiments, the springs 44 may also define the electrical contacts of the outer contact 40 for mating with the PCB 50, thus eliminating the need for the tabs 42.

Figure 7:
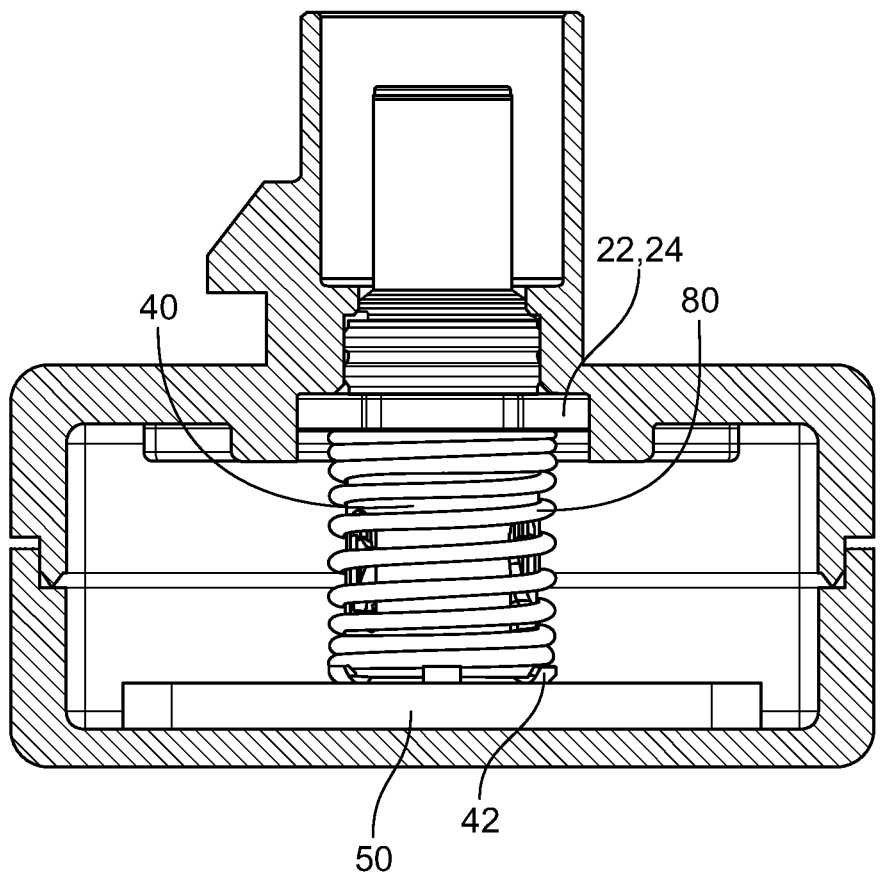
FIG. 7 is a cross-sectional view of a connector according to another embodiment of the present disclosure.

While the springs 44 may be embodied as elastic arms, other types of elastic element(s) may be utilized without departing from the scope of the present disclosure. For example, FIG. 7 illustrates a connector having a single coil spring 80 arranged over the outer contact 40. In this embodiment, the radially-extending bearing surface(s) 24 of the intermediate portion of the conductive body 22 may be reduced in a lateral or radial dimension, saving space and improving device packaging, while still providing adequate and evenly-distributed compressive force and axial float capabilities. In this embodiment, an end of the coil spring 80 proximate the PCB 50 may be supported and/or captured by a concave side of the contact tabs 42 opposite the PCB.

Referring particularly to the exploded view of FIG. 3, the outer conductive body 22 is hollow and receives a center contact or conductor assembly 30 of the connector 20 therein. In one embodiment, the center contact assembly 30 includes a conductive spring-loaded or "pogo" pin, including a male pin 32 attached to a body 34 at a first end thereof. The body 34 is configured to receive a spring 36 or other elastic element therein, as well as a movable second end of the assembly, embodied as a plunger 38 or a second pin. The plunger 38 is movably arranged within the body 34 and is biased by the spring 36 in direction opposite the male pin 32. The outer conductive body 22 is further configured to receive an inner seal or bushing 25 through which the male pin 32 of the assembly 30 is arranged via the second end 26. The center contact assembly 30 may be housed in a dielectric body 39, insulating the assembly from the outer conductor defined by the outer conductive body 22 and the outer contact 40. FIG. 4 provides an isolated assembled view of the connector 20 of FIGS. 2 and 3 prior to its installation into a housing.

Figure 5B:
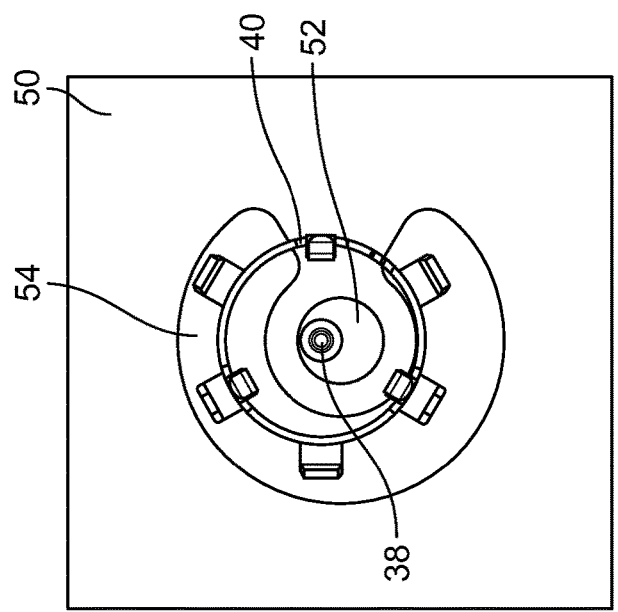
FIGS. 5A-5C are simplified top views of a portion of the connector of FIGS. 2-4 arranged in various lateral or radial positions relative to a circuit board according to an embodiment of the present disclosure.
Figure 5C:
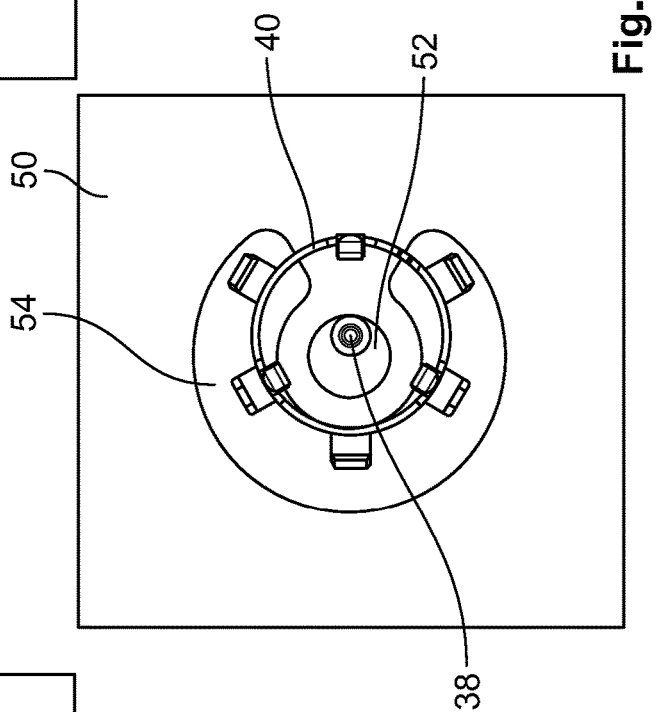
Figure 5A:
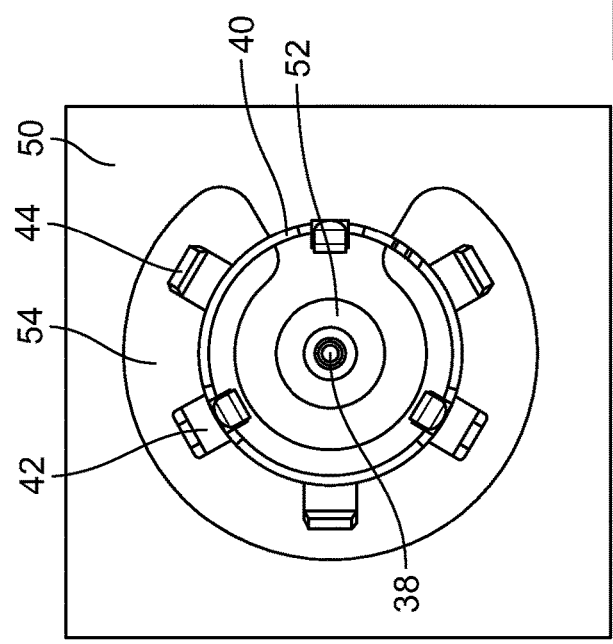

FIGS. 5A-5C illustrate a lateral or radial floating function of the connecter 20 and PCB 50 according to embodiments of the present disclosure, with a majority of the components of the connector removed for clarity. As shown, the PCB 50 includes two electrical contacts or contact pads; a signal or center contact 52 and a ground or outer contact 54. The center contact 52 and the outer contact 54 are configured to electrically connect to the movable second end or plunger 38 of the center contact assembly 30 and the tabs 42 of the outer contact 40 of the connector 20, respectively. The center contact 52 may be defined as a circular conductive contact pad formed on the PCB 50 which is over-sized in all dimensions (e.g., in diameter in the case of a circular pad) compared to an opposing contact surface or face of the plunger 38. In this way, any lateral or radial misalignment of the connector 20 relative to the PCB 50 will not prevent the center conductor from making suitable electrical contact with the center contact 52. In one exemplary non-limiting embodiment, the second end or plunger 38 of the center contact assembly 30 and the center contact 52 are sized so as to accommodate at least 1 mm of axial or lateral offset in any direction from the ideal position shown in FIG. 5A. In some embodiments, the minimum dimension of the center contact 52 in any direction coplanar with the contact surface of the PCB 50 is approximately 2-3 times larger than a maximum dimension of a contacting end of the center contact assembly 30 (e.g., a contacting face of the plunger 38).

Similarly, the second or outer contact 54 may comprise an arcuate pad shape. In one embodiment, the contact 54 may be continuously circular or ring-shaped in profile, or may be embodied as a plurality of discrete contacts. In the illustrated embodiment, however, the contact 54 is partially circular or semi-circular, defining an arcuate profile extending over at least 240 degrees with respect to an axis of curvature thereof (e.g., an axis defined through a radial center of the center contact 52). In this way, the outer contact 54 is sized so as to ensure contact with at least two contact tabs 42, or preferably three contact tabs each evenly spaced (e.g., radially spaced approximately 120 degrees) about a perimeter of the end of the outer contact 40. In the illustrated embodiment, only two contact tabs 42 are formed on the outer contact 40 and are in contact with the contact 54, with no tab present in a void defined between the ends of the second contact 54. The arcuate outer contact 54 may comprise a thickness or width in a planar direction of the PCB 50 that is similarly oversized to that of the center contact 52, such that it accommodates at least an equal amount of radial or lateral translation of the outer contact 40 relative to the PCB 50 while retaining electrical contact therewith. While FIGS. 5B and 5C illustrate radial offsets in only two directions, as is clear from the figures, embodiments of the present disclosure are capable of accommodating offset in any lateral or radial direction while retaining electrical connectivity.

Figure 6A:
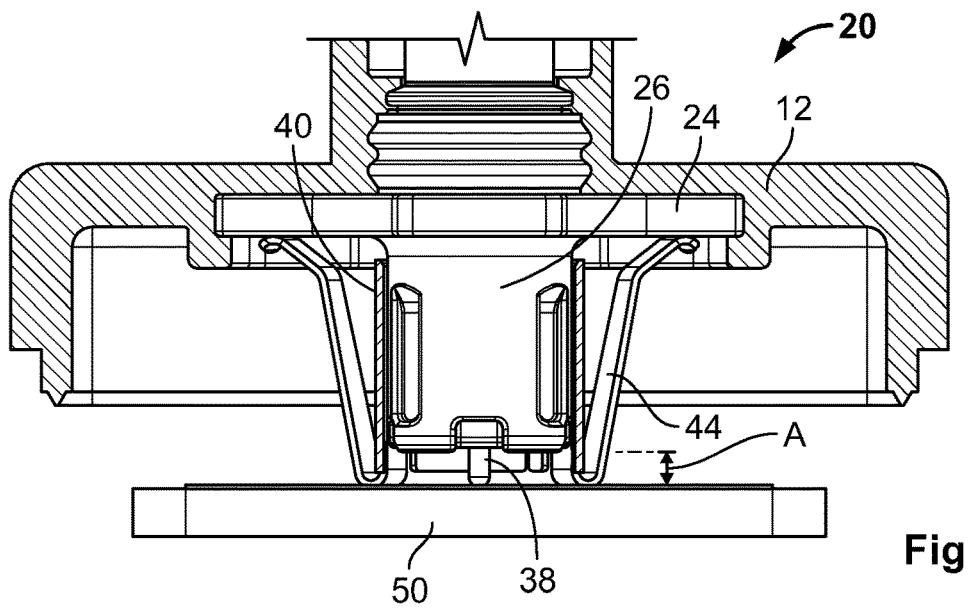
FIGS. 6A-6C are cross-sectional views showing a portion of a housing and a connector according to embodiments of the present disclosure mated with a circuit board, with the circuit board arranged in various vertical or axial positions relative to the housing and the connector.
Figure 6B:
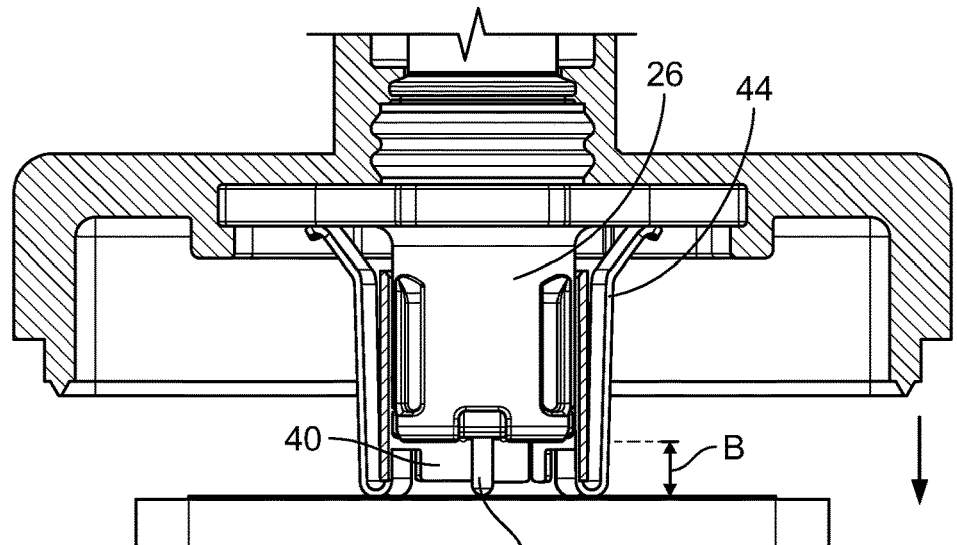
Figure 6C:
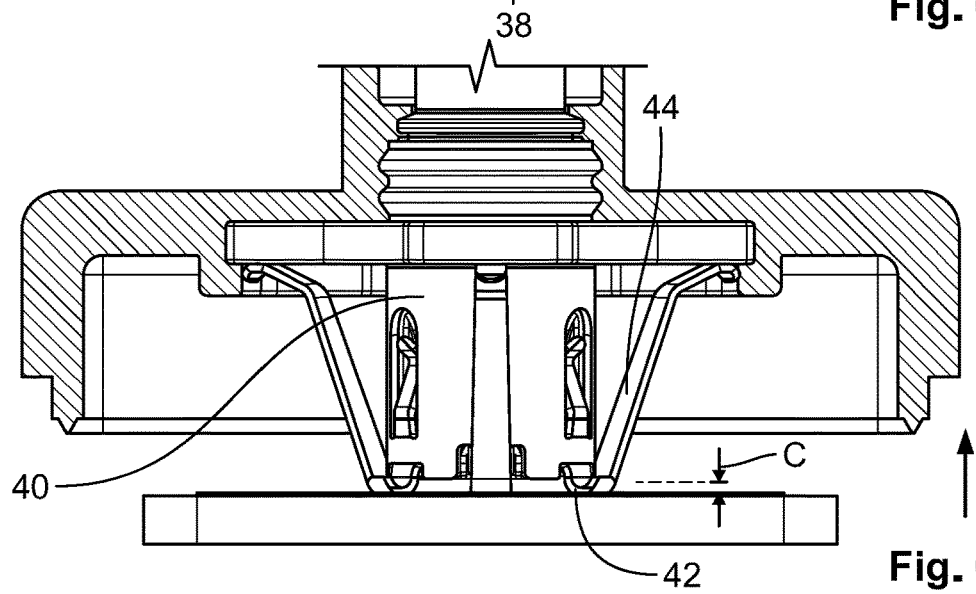

FIGS. 6A-6C illustrate an axial or vertical floating function of the connector 20 and the PCB 50 according to embodiments of the present disclosure. As shown, the connector 20 is capable of accommodating positional deviations of the PCB in the axial directions indicated in FIGS. 6B and 6C relative to an ideal position shown in FIG. 6A. As illustrated in FIG. 6A, when the first housing 12 and second housing (14, not shown) are attached to one another, the PCB 50 abuts the contact tabs 42 of the outer contact 40 under a compressive force generated by the springs 44. In the illustrated position, the second movable end or plunger 38 of the center contact assembly 30 is also arranged in an approximately intermediate position relative to the remainder of the assembly, wherein it remains free to move in either axial direction. Likewise, the outer contact 40 is arranged in an intermediate position along the length of the second end 26 of the outer conductive body 22, with the second end 26 positioned at a nominal distance A from the PCB 50. The spring tension on the outer contact 40 ensures reliable electrical contact with the PCB 50, accommodating any irregularities in the surface of the PCB (e.g., deviations from an ideal planar profile and other surface variations).

As shown in FIG. 6B, the PCB 50 is positioned further away from the connector 20 in the illustrated axial direction. Despite this variation, the outer contact 40 remains in contact with the PCB 50 as a result of the pressure applied thereto via the springs 44 which biases the outer contact along the second end 26 of the outer conductive body 22 and toward the PCB. In the exemplary illustrated position, the second end 26 is arranged at a maximum distance B from the PCB 50. As shown, the free ends of the springs 44 slide radially inward on the protrusions 24 as the outer contact 40 moves downwardly. However, as the springs remain in contact with the protrusions 24 of the outer conductive body 22, they continue to apply a compressive force on the outer contact 54 of the PCB 50, ensuring that suitable electrical contact is retained. The plunger 38 is likewise biased via the spring 36 in a downward direction, remaining in compressive contact with the first contact 52 of the PCB 50.

Similarly, FIG. 6C shows a reduction in the distance between the PCB 50 and the connector 20, wherein the plunger 38 has been is depressed further into the connector 20. As illustrated, the free ends of the springs 44 are splayed radially further outward compared to the position in FIG. 6A or 6B as the outer contact 40 is pressed further onto the second end 26 of the outer conductive body 22. In this way, the second end 26 of the outer conductive body 22 is able to be biased into a position corresponding to a minimum distance C relative to the PCB 50.

In each of the illustrated scenarios, electrical contact with the PCB is maintained despite these variations in axial and/or radial position. Accordingly, any manufacturing or assembly discrepancies affecting the relative positions of the above-described components may be accommodated, while retaining a high-performance electrical connection.

Figure 8:
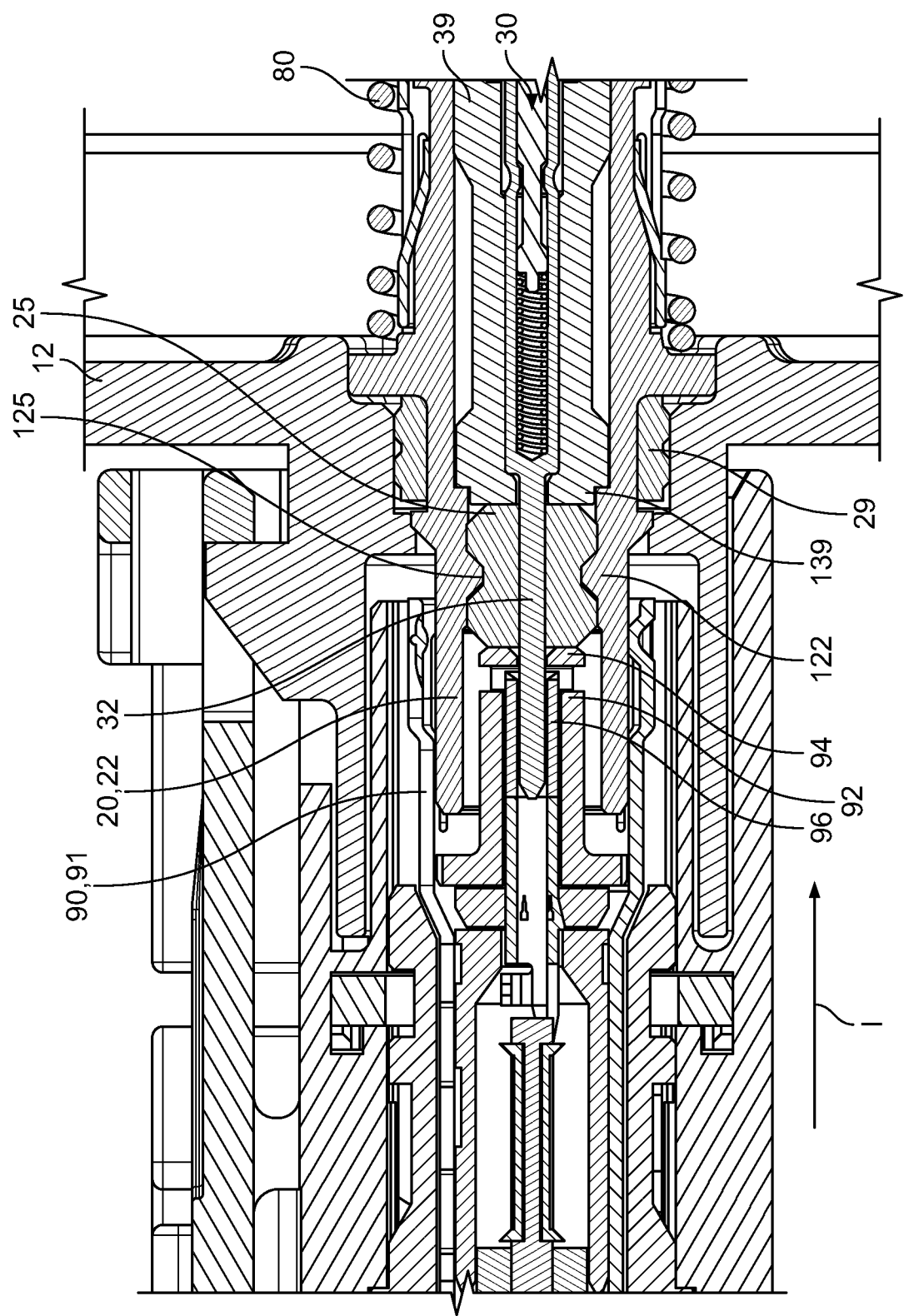
FIG. 8 is a cross-sectional view of a connector assembly including a first connector engaged with a mating connector according to an embodiment of the present disclosure.

Referring to FIG. 8, the connector 20 according to the above-described embodiments of the present disclosure is shown engaged with a second or mating connector 90. The mating connector 90 includes an outer conductive body 91, and a conductive center contact 96 supported within a dielectric body 92. During a mating operation performed in the illustrated relative mating or insertion direction I, the outer conductive body 22 of the connector 20 may be received by, and establish electrical contact with, the outer conductive body 91 of the mating connector 90. Likewise, as the connectors 20,90 are mated, the male pin 32 of the center contact assembly 30 of the connector 20 engages with the corresponding female conductive center connector or contact 96 of the mating connector 90 for establishing electrical contact therebetween.

As can be visualized from FIG. 8, according to prior art connectors which do not provide the illustrated inner seal or bushing 25, a front end 139 of the dielectric body 39 of the connector 20 and an opposing front end 94 of the dielectric body 92 of the mating connector 90 are biased toward one another until the connectors achieve a fully-mated position. In order to ensure that these dielectric bodies do not contact one another prior to the connectors being full mated, prior art connectors must be sized so as to ensure an air gap is present between the opposing front ends 139,94 of the dielectric bodies in the fully-mated position. Specifically, component production tolerances, as well as assembly tolerances, can significantly vary the final position of both dielectric bodies 39,92 along the illustrated axial or insertion direction I. Accordingly, a gap must be provided in order to ensure no unintended interference between these components occurs, thus potentially preventing the connectors from achieving a fully-mated state. It should be understood, however, that the necessary presence of an air gap between these insulating dielectric bodies degrades RF signal performance due to variations in impedance resulting from the changing dielectric constants moving in the axial direction across the connectors.

According to embodiments of the present disclosure, the exemplary inner bushing 25 of the connector 20 is adapted to remedy these shortcomings by effectively joining the front faces 139,94 of the dielectric bodies, without preventing the connectors from achieving a fully-mated state or position. More specifically, in the exemplary embodiments, the inner bushing 25 comprises an elastic bushing fitted within an interior of the outer conductive body 22 (see also FIG. 3). The bushing 25 may be retained within the outer conductive body 22 from movement in an axial direction via the engagement of an annular protruding rib 122 defined within the body 22 into a corresponding annular slot 125 defined about a circumference of the bushing 25.

In the mated position illustrated in FIG. 8, the front end 139 of the dielectric body 39 abuts a first side of the bushing 25, and the front end 94 of the dielectric body 92 abuts a second side of the bushing 25 in a compressive manner. Due to the elastic nature of the bushing 25, the above-described positional or dimensional variations affecting the ultimate axial positions of each connector 20,90 in the mated state are accommodated by the bushing. Specifically, the bushing 25 is adapted to compress or expand as needed to permit the connectors to establish a fully-mated position while maintaining contact with each dielectric body 39,92. The bushing 25 may be constructed of silicon, or other suitable material, preferably having a dielectric constant equal to or similar to (e.g., within 10% of, or more preferable within 5% of) the dielectric constants of the dielectric bodies 39,92. In this way, as the connectors define a continuous, uninterrupted dielectric insulating surface along the center conductive pathway, signal impedance is normalized and overall RF performance of the connector is improved over the above-described prior art arrangements.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. A connector assembly, comprising:
   an outer conductive body having a first end configured to mate with a corresponding electrical connector;
   a conductive center contact arranged within the outer conductive body, the center contact having a first end configured to mate with the corresponding electrical connector and a second end configured to electrically connect with a first electrical contact of a circuit board;
   an outer contact including a radially inward extending elastic arm slidably connected to a radially outward facing surface of a second end of the outer conductive body, the outer contact configured to electrically connect with a second electrical contact of the circuit board; and an elastic element configured to bias the outer contact in a direction away from the outer conductive body.

2. The connector assembly of claim 1, wherein the center contact comprises a first end and a second end movable with respect to the first end in an axial direction of the contact, the second end being elastically biased in a direction away from the first end.

3. The connector assembly of claim 1, wherein the elastic element comprises a spring arranged between the outer conductive body and the outer contact.

4. The connector of claim 3, wherein the spring comprises an elastic arm fixedly connected on a first end to one of the outer conductive body or the outer contact, and a second end slidably connected to the other one of the outer contact or the outer conductive body.

5. The connector assembly of claim 4, wherein the outer conductive body comprising a bearing surface extending radially outward therefrom and configured to slidably engage with the second end of the elastic arm, wherein biasing the outer contact in a direction toward the outer conductive body biases the second end of the elastic arm in a radially outward direction along the bearing surface.

6. The connector assembly of claim 5, further comprising a plurality of elastic arms having respective first ends arranged radially about the outer contact and respective second ends engaging with the bearing surface of outer conductive body, the bearing surface arranged radially about the outer conductive body.

7. The connector assembly of claim 3, wherein the spring comprises a coil spring arranged over the outer conductive body.

8. The connector assembly of claim 1, further comprising a circuit board including:
a first contact formed on the circuit board; and
a second contact formed on the circuit board and electrically isolated from the first contact.

9. The connector assembly of claim 8, wherein the first contact comprises a generally circular shape having a diameter greater than that of the movable second end of the center contact.

10. The connector assembly of claim 8, wherein the second contact at least partially surrounds the first contact.

11. The connector assembly of claim 10, wherein the second contact comprises an arcuate shape extending over at least 240 degrees of arc length with respect to an axis of curvature of the second contact.

12. The connector assembly of claim 8, further comprising a housing, including:
a first housing section receiving the outer conductive body; and
a second housing section coupled to the first housing section, wherein the circuit board is fixedly attached to the second housing section.

13. The connector assembly of claim 1, wherein the corresponding electrical connector is a coaxial radio frequency connector.

14. An electronic device comprising:
a housing;
a printed circuit board arranged within the housing and comprising a first electrical contact and a second electrical contact electrically isolated from the first electrical contact;
a connector assembly arranged within the housing and including:
an outer conductive body having a first end configured to mate with a corresponding electrical connector;
a conductive center contact arranged within the outer conductive body, the center contact having a first end configured to mate with the corresponding electrical connector and a second end in electrical contact with the first electrical contact of the circuit board;
an outer contact slidably connected to a second end of the outer conductive body, the outer contact in electrical contact with the second electrical contact of the circuit board; and
an elastic arm arranged between the outer conductive body and the outer contact and biasing the outer contact in a direction away from the outer conductive body and into contact with the second electrical contact of the circuit board, wherein biasing the outer contact in a direction toward the outer conductive body biases a free end of the elastic arm in a radially outward direction along a bearing surface defined by the outer conductive body.

15. The device of claim 14, wherein the center contact and outer contact are configured to maintain electrical contact with the first and second electrical contacts of the circuit board over a plurality of discrete positions of the circuit board relative to the connector in an axial direction of the connector.

16. The device of claim 14, wherein a contact area defined by the first electrical contact is greater than a contact area defined by the movable second end of the center contact, and a contact area of the second electrical contact is greater than a contact area defined by the outer contact such that the connector remains in electrical connection with the first and second electrical contacts in a plurality of discrete radial positions of the circuit board relative to the connector.

17. The device of claim 14, wherein the outer contact defines a plurality of contact tabs extending from an end thereof opposite the outer conductive body, the tabs configured to abut the second electrical contact of the circuit board.

18. A connector assembly, comprising:
a first electrical connector including:
a first outer conductive body;
a first dielectric body arranged within the first outer conductive body; and
a first conductive center contact arranged within the first dielectric body;
a second electrical connector mateable with the first electrical connector, including:
a second outer conductive body;
a second dielectric body arranged within the second outer conductive body; and
a second conductive center contact arranged within the second dielectric body,
wherein in a mated state of the first and second electrical connectors, the first and second outer conductive bodies and the first and second conductive center contacts are electrically connected; and
an elastic bushing defines a radial groove formed about its circumference, arranged between and contacting the first outer conductive body and the first conductive center contact, defining an opening formed therethrough, receiving the conductive center contact of the first electrical connector and arranged between and contacting opposing faces of the first and second dielectric bodies with the first and second electrical connectors in the mated state.

19. The connector assembly of claim 18, wherein the elastic bushing is monolithic and is arranged within an interior of the outer conductive body of the first electrical connector.

20. The connector assembly of claim 19, wherein the outer conductive body defines an annular protrusion extending into the interior of the outer conductive body and engaging with the radial groove.

* * * * *